(12) United States Patent
Walters, III

(10) Patent No.: US 6,307,179 B1
(45) Date of Patent: Oct. 23, 2001

(54) WIRE WELDING GUN HAVING IMPROVED CONNECTION BETWEEN A CONTACT TIP AND ITS MATING PART

(75) Inventor: John D. Walters, III, Bradenton, FL (US)

(73) Assignee: American Torch Tip Company, Bradenton, FL (US)

( * ) Notice: Subject to any disclaimer, the term of this patent is extended or adjusted under 35 U.S.C. 154(b) by 0 days.

(21) Appl. No.: 09/419,110

(22) Filed: Oct. 15, 1999

(51) Int. Cl.[7] .................................................. B23K 9/24
(52) U.S. Cl. ................................ 219/137.42; 219/137.61
(58) Field of Search .............................. 219/137.61, 136, 219/137.2, 137.31, 132.42

(56) References Cited

U.S. PATENT DOCUMENTS

| | | | |
|---|---|---|---|
| 2,761,049 | 8/1956 | McElrath et al. | 219/14 |
| 3,007,033 | 10/1961 | Newman et al. | 219/137 |
| 3,469,070 | 9/1969 | Bernard et al. | 219/130 |
| 4,282,419 | 8/1981 | Auer | 219/137.44 |
| 5,440,100 | 8/1995 | Stuart et al. | 219/137.31 |
| 5,726,420 | 3/1998 | Lajoie | 219/137.61 |
| 5,760,373 | 6/1998 | Colling | 219/137.61 |
| 6,075,227 | * 6/2000 | Lajoie | 219/137.61 |

* cited by examiner

Primary Examiner—Clifford C. Shaw
(74) Attorney, Agent, or Firm—Sughrue, Mion, Zinn, Macpeak & Seas, PLLC

(57) ABSTRACT

A welding gun contact tip which seats within a retaining member and in two different seating locations relative to the contact member. The contact tip includes an interwoven-double-start thread having two thread cuts which start 180 degrees from one another as measured around the circumference of the contact tip. Additionally, the retaining member includes an interwoven-double-start thread having two thread cuts which start 180 degrees from one another as measured around the circumference of the contact tip. Because of the configuration of the interwoven-double-start threads, the two seating locations of the contact tip are 180 degrees apart thereby enabling the contact tip to be used twice as long as a conventional contact tip which includes a single cut thread. Further, the contact tip and retaining member include mating frustum surfaces which are configured and dimensioned so that the contact tip seats within the retaining member with less than one turn of the contact tip relative to the retaining member. Therefore, the contact tip may be quickly inserted in, and removed from, the retaining member. Moreover, the mating frustum surfaces, and interwoven-double-start threads provide a large area of contact between the contact tip and retaining member hence providing a strong connection, as well as reducing resistance heating, therebetween.

20 Claims, 3 Drawing Sheets

WIRE WELDING GUN HAVING IMPROVED CONNECTION BETWEEN A CONTACT TIP AND ITS MATING PART

BACKGROUND OF THE INVENTION

1. Field of the Invention

The present invention relates generally to welding guns and, more particularly, to a connection between a welding gun tip and a retaining member.

2. Related Art

In metal inert gas (mig) welding, the welding gun contact tip must satisfactorily perform two important functions. First, it must accurately guide a weld wire to the point of contact with the workpiece. Second, it must conduct adequate current, which can be as high as 400 amps or more, to the weld wire. To achieve those results, it is known to provide a relatively long contact tip made of copper and having an axial hole therethrough. The hole is sized slightly larger than the diameter of the weld wire. The contact tip extends from a gas diffuser through which an inert gas is directed around the welding arc. Current to the contact tip is supplied to it through the gas diffuser.

Contact tips are particularly subject to at least two modes of failure. The first is burnbank, which occurs if the feeding of weld wire through the contact tip is stopped while an arc is maintained. The second mode of failure is wearing of the through hole due to the abrasive nature of the weld wire material. In addition, because the contact tip is so close to the welding arc, and because the tip must carry high electrical currents, it becomes very hot. The high temperatures also have a deleterious effect on the contact tip, due in part because the hotter the tip becomes the softer it becomes, which makes it less resistant to wear from the weld wire. A properly worn contact tip has a groove on one side of the inside hole.

Due to the severe operating conditions, contact tips have relatively short service lives. Consequently, they are treated as consumable items in the industry. Typically, contact tips are made as separate pieces that are threaded into a gas diffuser. The thread is a single thread and, therefore, each contact tip has only one seating location with respect to the gas diffuser. When a contact tip has worn, it is threaded out of the gas diffuser, is discarded, and a new one is screwed into its seating location.

As noted above, in addition to heating caused by the welding arc, another potential source of heat to the contact tip is the threads between it and the gas diffuser. That is, the threads can cause resistance heating. To minimize electrical resistance, the contact tip and gas diffuser threads have a relatively long engagement length and a fine pitch. However, the long engagement, fine pitch, thread presents a problem. Removing a worn contact tip from the gas diffuser requires several turns of the contact tip. If the weld wire has burned back and fused to the contact tip, the weld wire must twist through the same number of turns as the contact tip. The potential springback of the fully removed contact tip due to the twisted weld wire is annoying if not potentially dangerous. Moreover, the time required to disassemble the multiple-turn contact tip also contributes to down-time of the welding production area.

Although the prior art has individually addressed the problems of short service life of a contact tip, resistance heating, and quick replacement of a contact tip, there has not been one convenient configuration which solves all of these problems.

U.S. Pat. No. 5,440,100 to Stuart et al. and U.S. Pat. No. 3,469,070 to Bernard et al. each discloses a contact tip which can be seated in two different positions within a gas diffuser. Stuart and Bernard use a projection on the gas diffuser, wherein the projection fits into a groove on the contact tip. But such a connection is weak both mechanically, and electrically. Mechanically, there is only a point contact between the gas diffuser and contact tip which holds them together. In Stuart, a dimple or protrusion extends from the gas diffuser, however, the dimple is subject to wear each time a contact tip is inserted within the gas diffuser thereby making the mechanical connection loose over time. In Bernard, a set screw in the gas diffuser extends into a bore which receives the contact tip. The tip of the set screw fits into recessed guideways on the contact tip. But the set screw may loosen due to vibration during use of the welding gun and, therefore, weaken the mechanical connection between the contact tip and gas diffuser. Further, the point contact tends to loosen easily thereby allowing the contact tip to rattle within, and quite possibly come out of, the gas diffuser which would be a big problem during welding operations. Electrically, each Stuart and Bernard suffers the drawback of resistance heating near the limited point contact between the projection and the groove which hold the parts together.

U.S. Pat. No. 5,760,373 to Colling address the problem of resistance heating by providing a welding device having a tapered connection between a contact tip and a gas diffuser. However, Colling still suffers the drawback of requiring a full turn of the contact tip to remove or insert it within the gas diffuser. Moreover, Colling's contact tip seats in only one position relative to the gas diffuser and, therefore, suffers the additional drawback of a short service life.

Similarly to Colling, U.S. Pat. No. 5,726,420 to Lajoie provides a welding device having a tapered connection between a contact tip and a gas diffuser. Lajoie claims to enable quick replacement of the contact tip, however, Lajoie's device requires 2½ turns of the contact tip relative to the gas diffuser in order to remove or insert it. Lajoie's required 2½ turns is still quite time consuming and, therefore, contributes to a long down-time during replacement of the contact tip. Further, Lajoie's contact tip seats in only one position relative to the gas diffuser and, therefore, suffers the additional drawback of a short service life.

SUMMARY OF THE INVENTION

It is an object of the present invention to overcome the disadvantages of the prior art by providing one welding apparatus configuration which solves the problems of short service life, resistance heating, and quick replacement of the contact tip, with one simple design. It is another object of the invention to provide a welding apparatus with a contact tip that has a longer service life than conventional contact tips, thereby reducing the cost of operating the welding apparatus. Further, it is an object of the present invention to provide a welding apparatus in which a contact tip and gas diffuser quickly may be connected and disconnected, thereby reducing the time necessary for replacement of the contact tip and thus decreasing down-time of a welding production area. Further, although the contact tip may be quickly removed and inserted within the gas diffuser, the present invention provides a strong connection therebetween which also minimizes resistance heating.

In accordance with the present invention, a welding apparatus is provided with a contact tip having a longer service life—about twice as long as a conventional contact tip. In order to provide longer service life, the contact tip has an interwoven-double-start thread, wherein the thread-cut starting points are 180 degrees from one another. Additionally, the gas diffuser has contact-tip-mating thread which is also an interwoven-double-start thread, wherein the thread-cut starting points are 180 degrees from one another. By providing an interwoven-double-start thread on both the contact tip and the gas diffuser, the contact tip may be seated in two positions, 180 degrees apart from one another, relative to the gas diffuser. Thus, once the inside hole of the contact tip is worn on one side—as it is in a properly worn contact tip—the contact tip can be removed, rotated 180 degrees, and reinserted so that the unworn side of the inside hole may then be used. By rotating the tip, the wire can access the remaining good side of the hole, and the welding operation can continue with the same tip.

Additionally, in accordance with the present invention, a quick release contact tip is provided that minimizes resistance heating between the contact tip and a gas diffuser. The contact tip and gas diffuser are designed to seat with less than one turn of the contact tip relative to the gas diffuser, thereby reducing the time necessary to change a contact tip. Even though the contact tip seats with less than one turn, the connection between it and a gas diffuser is strong because of the interwoven-double-start threads. The interwoven-double-start threads, on both the contact tip and gas diffuser, provide a longer effective thread length—over less than one turn—as opposed to the conventional single thread. The longer effective thread length strengthens the connection as well as reduces resistance heating. Thus, the interwoven double-start threads reduce the resistance heating and increase connection strength while minimizing the number of turns required to seat the contact tip in the gas diffuser. To further strengthen the connection between the contact tip and gas diffuser, as well as to reduce resistance heating, the contact tip and gas diffuser have mating frustum surfaces.

The upstream end of the gas diffuser may be constructed to suit any desired wire welding gun handle. The various ports and passages for the shielding gas may also take any desired shape. The downstream end of the gas diffuser is provided with a frustum-shaped cavity having its apex end toward the gas diffuser upstream end. The base of the frustum-shaped cavity terminates in an interwoven-double-start thread which terminates at the downstream edge of the gas diffuser.

The downstream end of the contact tip may be conventional. The upstream end is formed as a frustum of the same taper and diameters as the frustum-shaped cavity in the gas diffuser. The base end of the contact tip frustum terminates in an interwoven-double start thread that matches that on the gas diffuser.

With the contact tip assembled to the gas diffuser, the entire area of the contact tip's frustum is in intimate facing contact with the gas diffuser's frustum-shaped cavity. In addition, the engaged areas of the interwoven double-start threads of the two parts are in contact. The large areas of contact between the two parts provide a strong connection, as well as enable them to handle heavy current with minimized resistance heating. Further, quick replacement is possible because less than one reverse turn of the contact tip is required to remove it from, and insert it into, the gas diffuser.

BRIEF DESCRIPTION OF THE DRAWINGS

The above as well as other objects and advantages of the present invention will become more apparent by describing in detail preferred embodiments thereof with reference to the accompanying drawings, wherein like reference numerals designate like or corresponding parts throughout the several views, and wherein:

FIG. 4 is a schematic diagram of an interwoven-double-start thread, as is on both the gas diffuser and contact tip of the present invention.

DETAILED DESCRIPTION OF THE INVENTION

Figure 1:
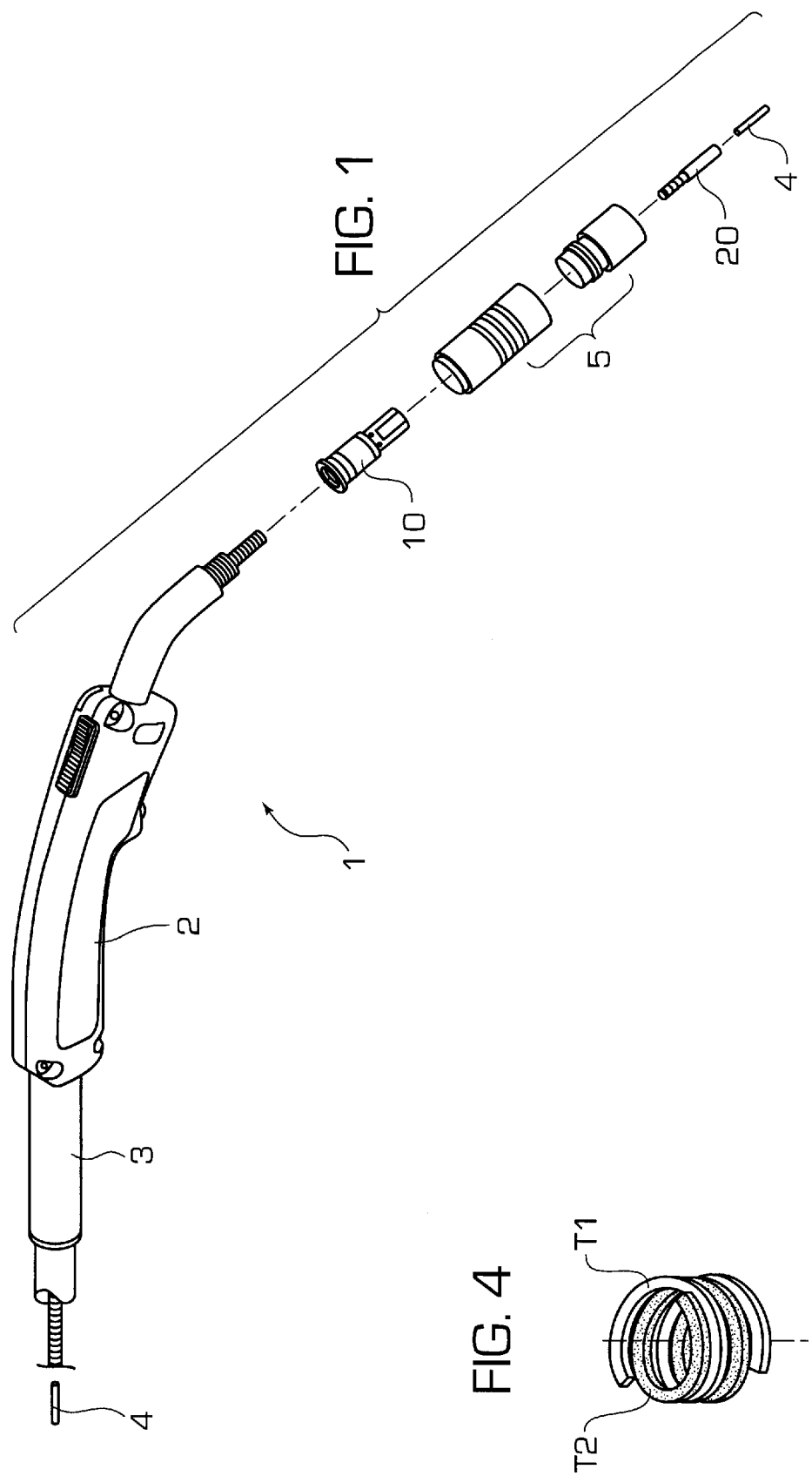
FIG. 1 is an exploded perspective view of a wire welding gun that includes the present invention.

Referring to FIG. 1, a wire welding gun 1 is illustrated that includes the present invention. The particular wire welding gun 1 shown is merely representative of a wide variety of guns that can advantageously employ the invention. The gun has a handle 2 to which is joined one end of a gas diffuser 10. A contact tip 20 is threaded to the other end of the gas diffuser 10. A nozzle 5, which is usually adjustable on the gas diffuser, surrounds the gas diffuser 10 and most of the contact tip 20. A long flexible weld wire 4 is fed to the handle 2, the gas diffuser 10, and out the contact tip 20.

Electrical power is supplied to the gun 1 by cables represented at reference numeral 3. The power is conducted to the contact tip 20 by the gas diffuser 10, and from the contact tip 20 to the weld wire 4.

In accordance with the present invention, the gas diffuser 10 and contact tip 20 are designed so that the contact tip 20 can be seated, and used, in two different positions relative to the gas diffuser 10. Further, the gas diffuser 10 and contact tip 20 are designed to provide a quick release, yet strong connection, therebetween while conducting maximum current to the weld wire 4. In the embodiment shown in FIGS. 2 and 3, the gas diffuser 10 is generally tubular in shape, having an upstream end 11, a downstream end 17, and an axial passage 13. Internal threads 12 extend within the upstream end of the axial passage 13. The threads 12 join with similar threads on the gun handle 2. Radial holes 14 pass through the wall of the gas diffuser 10 from the axial passage 13 to the outside of the gas diffuser 10.

An internal interwoven-double-start thread 16 is machined into the downstream end of the axial passage 13. A frustum-shaped cavity 15 is adjacent the upstream side of the interwoven-double-start thread 16. The frustum-shaped cavity 15 includes a taper such that a surface forming the frustum-shaped cavity 15 has any suitable angle with respect to the longitudinal axis of the gas diffuser 10. The frustum-shaped cavity 15 and interwoven-double-start thread 16 are used to connect the gas diffuser 10, to the contact tip 20.

The contact tip 20 has an upstream end 21 and a downstream end 27. An inside hole 26 extends axially through the interior of the contact tip 20 over its entire length. The contact tip 20 further includes a frustum 23 at the upstream end thereof. The frustum 23 has the same taper and diameters as the frustum-shaped cavity 15 of the gas diffuser 10. At the apex end of the frustum 23, the inside hole 26 has a tapered receiving portion 22. The tapered receiving portion 22 helps guide the weld wire 4 from the gas diffuser 10 through the inside hole 26 of the contact tip 20. Adjacent the base end of the frustum 23, an interwoven-double-start thread 24 is provided. The interwoven double-start thread 24 has the same diameter and pitch as the gas diffuser interwoven-double-start thread 16.

A working end 25 of the contact tip 20 extends from the interwoven-double-start thread 24 to the downstream end 27. The working end 25 may have a cylindrical surface, as shown, or any other suitable shape as, for example, that of a frustum, or combination of cylindrical surface and frustum. Additionally, the working end 25 may have a polygonal cross section. Further, when the working end 25 does not include a cross section having flat surfaces, it may be provided with wrench flats 28 to assist in turning the contact tip 20 relative to the gas diffuser 10.

Figure 2:
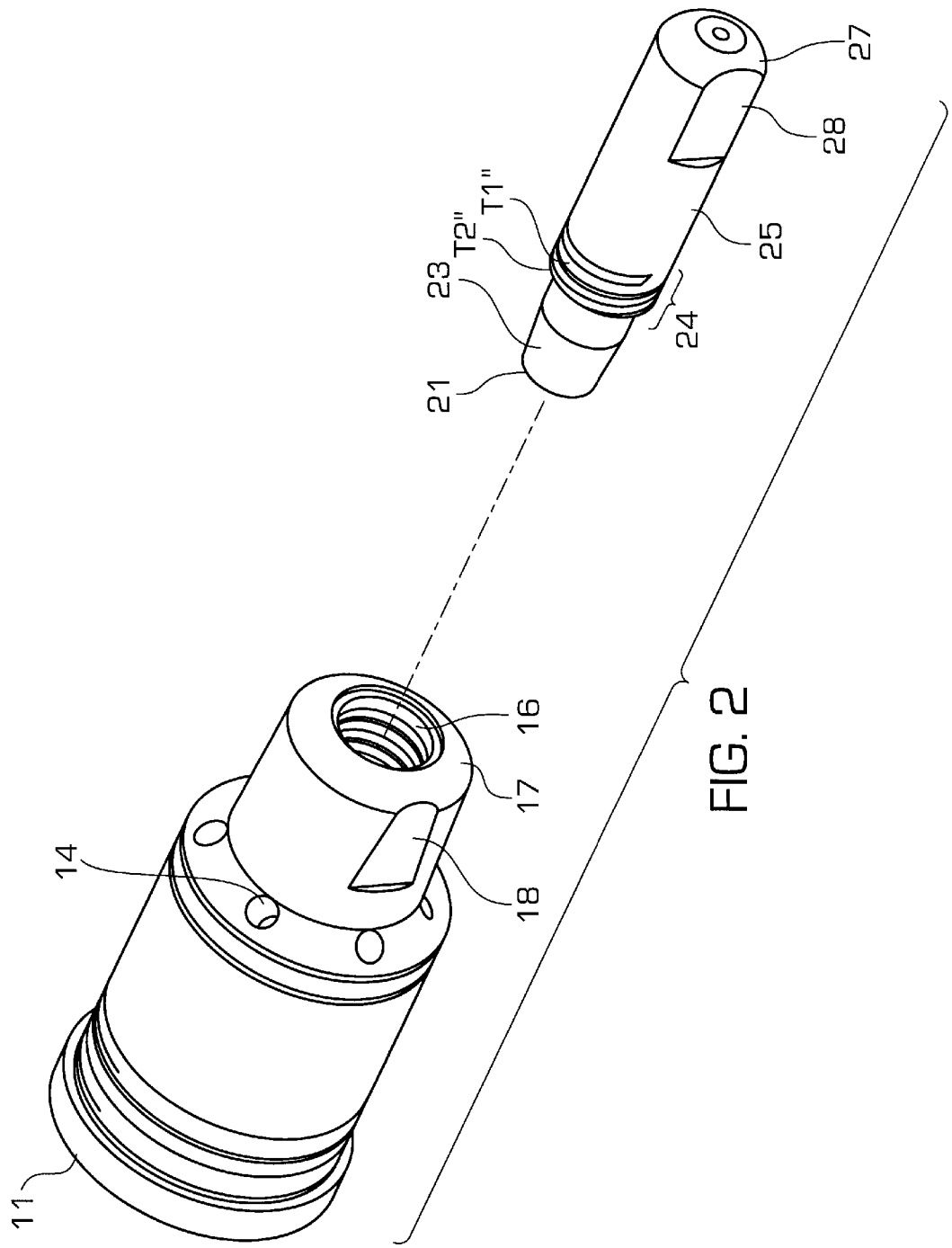
FIG. 2 is an exploded perspective view of a gas diffuser and contact tip according to the present invention.
Figure 3:
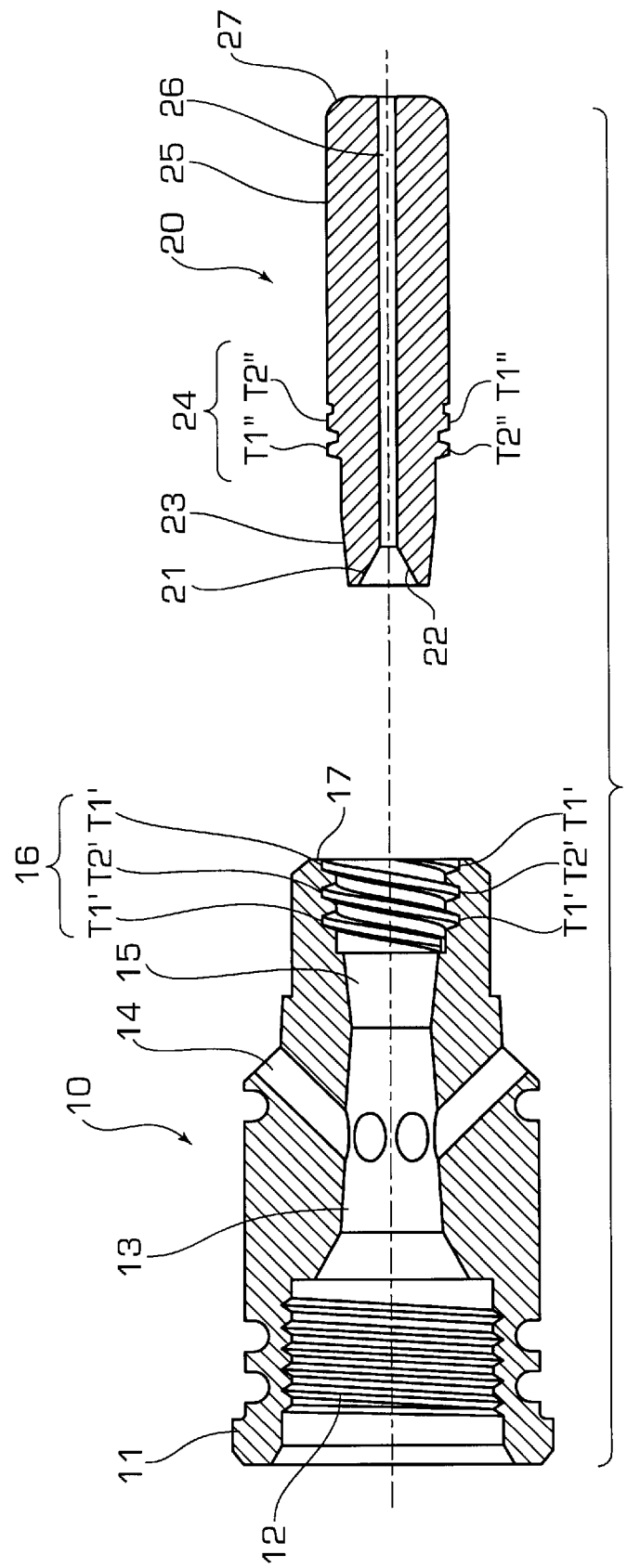
FIG. 3 is a cross-sectional view of the gas diffuser and contact tip according to the present invention.

A schematic diagram of an interwoven-double-start thread is shown in FIG. 4. The schematic diagram is representative of each the interwoven-double-start thread 16 on the gas diffuser, and the interwoven-double-start thread 24 on the contact tip. That is, the interwoven-double-start threads 16, 24 are similar because they correspond to, and mate with, one another. As shown in FIG. 4, the interwoven-double-start thread pattern includes two thread cuts T1 and T2. The thread cuts T1 and T2 start in the same plane, but 180 degrees from one another, as measured around the circumference of the part on which they are located. Further, the turns of one thread cut, T1 for example, are disposed between adjacent turns of the other thread cut T2. That is, the thread cuts T1 and T2 alternate along an axial line extending parallel to the longitudinal axis of the part on which they are located. As shown in FIG. 3, then, the interwoven-double-start thread 16 includes thread cuts T1' and T2' which are similar to the schematic thread cuts T1 and T2, respectively, of FIG. 4. Similarly, as shown in FIGS. 2 and 3, the interwoven-double-start thread 24 includes thread cuts T1" and T2" which are similar to the schematic thread cuts T1 and T2, respectively, of FIG. 4. The thread cuts T1', T2', T1" and T2" are designed so that the interwoven-double-start thread 16 on the gas diffuser mates with the interwoven-double-start thread 24 on the contact tip.

The gas diffuser 10 and the contact tip 20 are used by screwing the internal threads 12 of the gas diffuser to corresponding threads on the gun handle 2. The downstream end of the gas diffuser 10 may have wrench flats 18 on the exterior thereof to assist in attaching the gas diffuser 10 to the gun handle 2 and/or to the contact tip 20. The frustum 23 of the contact tip 20 is inserted into the downstream end 17 of the gas diffuser until the contact tip interwoven-double-start thread 24 contacts the gas diffuser interwoven-double-start thread 16. The initial orientation between the contact tip 20 and gas diffuser 10 is relatively unimportant—only after one side of the contact tip inside hole 26 is worn does the relative orientation become important. The contact tip 20 is then turned until the interwoven-double-start threads 16, 24 engage. The contact tip 20 is further turned until the frustum 23 comes into contact with the frustum-shaped cavity 15 of the gas diffuser 10, thereby connecting the contact tip 20 to the gas diffuser 10 in a first seating location. The interwoven-double-start threads 16, 24, frustum 23, and frustum-shaped cavity 15 are configured and dimensioned so that the frustum 23 mates with the wall of the frustum-shaped cavity 15 after less than one turn of the contact tip 20 in the gas diffuser 10, after their interwoven-double-start threads 16, 24 have initially engaged, and before the contact tip interwoven-double-start thread 24 has reached the end of the gas diffuser interwoven-double-start thread 16. That is, the turning of the contact tip 20 into the gas diffuser 10 is limited by the contact between the frustum 23 and the frustum-shaped cavity 15; not by the contact tip interwoven-double-start thread 24 bottoming on the gas diffuser interwoven-double-start thread 16.

With the contact tip 20 assembled to the gas diffuser 10, in its first seating location, the weld wire 4 can be fed through the gas diffuser axial passage 13 and to the contact tip inside hole 26. During use of the contact tip 20 in its first seating location, the weld wire 4 wears a groove into one side of the inside hole 26. When that one side of the inside hole 26 can no longer be used, the contact tip 20 is merely unscrewed from the gas diffuser 10, turned 180 degrees, and then re-screwed into the gas diffuser 10. Because both the contact tip 20 and gas diffuser 10 have interwoven-double-start threads 24 and 16, respectively, the contact tip 20 is seated in the gas diffuser 10 in a second seating location which is turned 180 degrees from its first seating location. Thus, during subsequent use, the weld wire will contact the side of the inside hole 26 that has not been previously worn with a groove. That is, both sides of the inside hole 26 of the contact tip 20 may be used before it must be discarded. Thus, the present invention reduces the cost of operating a welding apparatus because the contact tip 20 may be used approximately twice as long.

When it is necessary to remove a contact tip 20, less than one reverse turn is sufficient to release it from the gas diffuser 10. Twisting of a weld wire 4 burnt onto the contact tip 20 is thus limited to less than one turn. Similarly, a new contact tip 20 is assembled—or the same contact tip is reassembled after having been rotated 180 degrees—to the gas diffuser 10 with less than one turn. The entire replacement process is accomplished with very little down-time.

Moreover, although the contact tip 20 is rotated less than one turn before seating within the gas diffuser 10, there is a large area of contact therebetween. The frustum 23 contacts the frustum-shaped cavity 15 and the interwoven-double-start threads 16, 24 contact one another. The large contact area provides the contact tip 20 with a strong seat in the gas diffuser 10. Additionally, when the contact tip 20 is seated in both its first and second seating locations within the gas diffuser 10, a considerable current can be conducted to the weld wire 4 by the gas diffuser 10 and contact tip 20 because of the large area of contact between the two parts. Consequently, resistance heating in and between the parts during operation of the gun 1 is minimal.

It is contemplated that numerous modifications may be made to the welding device of the present invention without departing from the spirit and scope of the invention as defined in the following claims. For example, one of the contact tip and gas diffuser could, of course, have an interwoven-double-start thread whereas the other of the contact tip and gas diffuser could then include a single thread having a pitch corresponding to one thread cut of the interwoven-double-start thread. With such an arrangement, the contact tip would still be able to seat in two different locations with respect to the gas diffuser thereby extending the service life of the contact tip.

I claim:

1. A contact tip, for a welding apparatus, comprising:
   a body having a first end, a second end, and a longitudinal axis, wherein said first end is opposite to said second end along said longitudinal axis;
   a hole in said body and extending along said longitudinal axis from said first end to said second end; and
   an interwoven-double-start thread on said first end of said body,
   wherein said interwoven-double-start thread includes two thread cuts, each of said two thread cuts having a transverse profile with a base that tapers to a flat crest.

2. The contact tip of claim 1, further comprising a frustum on said first end of said body.

3. The contact tip of claim 2, wherein said interwoven-double-start thread is positioned along said longitudinal axis between said frustum and said second end of said body.

4. The contact tip of claim 2, further comprising a tapered receiving portion on said first end of said body and within said frustum, said tapered receiving portion communicating with said hole so as to direct welding wire to said hole.

5. The contact tip of claim 1, wherein said interwoven-double-start thread comprises two thread cuts that start at positions which are 180 degrees from one another as measured around the circumference of said body.

6. The contact tip of claim 1, wherein said interwoven-double-start thread comprises a first thread cut and a second thread cut which are interwoven so that said first thread cut alternates with said second thread cut along a line parallel to said body longitudinal axis.

7. A gas diffuser, for a welding apparatus, comprising:
a body having a first end, a second end, and a longitudinal axis, wherein said first end is opposite said second end;
an axial passage through said body and extending along said longitudinal axis from said first end to said second end; and
an interwoven-double-start thread on said second end of said body and in said axial passage,
wherein said interwoven-double-start thread includes two thread cuts, each of said two thread cuts having a transverse profile with a base that tapers to a flat crest.

8. The gas diffuser of claim 7, further comprising a frustum-shaped cavity on said second end of said body and in said axial passage.

9. The gas diffuser of claim 8, wherein said frustum-shaped cavity is positioned along said longitudinal axis between said interwoven-double-start thread and said first end of said body.

10. The gas diffuser of claim 7, wherein said interwoven-double-start thread comprises two thread cuts that start at positions which are 180 degrees from one another as measured around the circumference of said body.

11. The gas diffuser of claim 7, wherein said interwoven-double-start thread comprises a first thread cut and a second thread cut which are interwoven so that said first thread cut alternates with said second thread cut along a line parallel to said body longitudinal axis.

12. A welding apparatus comprising:
a contact tip, and a gas diffuser which seats said contact tip therein,
wherein said contact tip includes
(1) a body having a first end, a second end, and a longitudinal axis, wherein said first end is opposite to said second end along said longitudinal axis;
(2) a hole in said body and extending along said longitudinal axis from said first end to said second end; and
(3) an interwoven-double-start thread on said first end of said body, wherein said contact tip interwoven-double-start thread includes two thread cuts, each of said two thread cuts having a transverse profile with a base that tapers to a flat crest;
wherein said gas diffuser includes
(1) a gas diffuser body having a first end, a second end, and a longitudinal axis, wherein said gas diffuser first end is opposite said gas diffuser second end;
(2) an axial passage through said gas diffuser body and extending along said gas diffuser longitudinal axis from said gas diffuser first end to said gas diffuser second end; and
(3) an interwoven-double-start thread on said gas diffuser body second end and in said axial passage, and
wherein said interwoven-double-start thread on said contact tip mates with said interwoven-double-start thread on said gas diffuser.

13. The welding apparatus of claim 12, further comprising a frustum on said contact tip first end, and a frustum-shaped cavity on said gas diffuser second end.

14. The contact tip of claim 13, wherein said frustum and said frustum-shaped cavity are configured with the same tapers so as to mate with one another and thereby seat said contact tip within said gas diffuser.

15. The contact tip of claim 14, wherein said frustum and said frustum-shaped cavity are positioned relative to said contact tip interwoven-double-start thread and relative to said gas diffuser interwoven-double-start thread so that said contact tip seats within said gas diffuser in less than one turn of said contact tip relative to said gas diffuser.

16. The welding apparatus of claim 12, wherein said contact tip interwoven-double-start thread comprises two thread cuts that start at positions which are 180 degrees from one another as measured around the circumference of said contact tip body.

17. The welding apparatus of claim 12, wherein said gas diffuser interwoven-double-start thread comprises two thread cuts that start at positions which are 180 degrees from one another as measured around the circumference of said gas diffuser body so that said contact tip seats within said gas diffuser in two different positions relative to said gas diffuser.

18. The welding apparatus of claim 12, wherein said gas diffuser interwoven-double-start thread comprises two thread cuts that start at positions which are 180 degrees from one another as measured around the circumference of said gas diffuser body.

19. The welding apparatus of claim 12, wherein said contact tip interwoven-double-start thread comprises a first thread cut and a second thread cut which are interwoven so that said first thread cut alternates with said second thread cut along a line parallel to said contact tip longitudinal axis.

20. The welding apparatus of claim 12, wherein said gas diffuser interwoven-double-start thread comprises a first thread cut and a second thread cut which are interwoven so that said first thread cut alternates with said second thread cut along a line parallel to said gas diffuser longitudinal axis.

* * * * *